United States Patent [19]
McCall et al.

[11] Patent Number: 5,932,868
[45] Date of Patent: Aug. 3, 1999

[54] CLEANING SYSTEM FOR A CARD READER

[75] Inventors: Don C. McCall, Round Rock; David A. Biedermann, Austin, both of Tex.

[73] Assignee: Dresser Industries, Inc., Dallas, Tex.

[21] Appl. No.: 08/721,002

[22] Filed: Sep. 26, 1996

[51] Int. Cl.[6] ............................ G06K 7/08; G06K 19/06
[52] U.S. Cl. .......................................... 235/493; 235/449
[58] Field of Search ........................ 360/100.1; 235/486, 235/493, 449, 381

[56] References Cited

U.S. PATENT DOCUMENTS

| | | | |
|---|---|---|---|
| 3,764,978 | 10/1973 | Tyburski et al. | 340/146.3 D |
| 4,295,051 | 10/1981 | Graf et al. | 250/569 |
| 4,734,145 | 3/1988 | Monia | 156/244.11 |
| 4,847,716 | 7/1989 | Kemp | 360/128 |
| 4,868,699 | 9/1989 | Kingsbury et al. | |
| 4,868,700 | 9/1989 | Fritsch et al. | |
| 4,870,636 | 9/1989 | Yamamoto. | |
| 4,883,950 | 11/1989 | Chiba et al. | 235/440 |
| 4,928,189 | 5/1990 | Siddiq. | |
| 5,152,516 | 10/1992 | Okayama et al. | |
| 5,223,329 | 6/1993 | Amann. | |
| 5,235,485 | 8/1993 | Martin. | |
| 5,237,477 | 8/1993 | Hodapp et al. | |
| 5,381,292 | 1/1995 | Richmond. | |
| 5,420,729 | 5/1995 | Lee. | |
| 5,438,186 | 8/1995 | Nair et al. | 235/449 |
| 5,514,856 | 5/1996 | Kitahara et al. | 235/440 |
| 5,545,883 | 8/1996 | Sasou et al. | 235/449 |
| 5,694,326 | 12/1997 | Warn et al. | 364/479.01 |
| 5,719,781 | 2/1998 | Leatherman et al. | 364/479.02 |
| 5,832,556 | 11/1998 | Eyler | 15/104.93 |

*Primary Examiner*—Thien Minh Le
*Assistant Examiner*—Daniel Sherr
*Attorney, Agent, or Firm*—Haynes and Boone, LLP

[57] ABSTRACT

A cleaning system and method for a card reader device that initiates a prompt when a head of the card reader device needs to be cleaned, and cancels the prompt only when the head has been cleaned. A card reader device is connected to a computer system which determines when the card reader device should be cleaned. When it is time for the card reader device to be cleaned, the computer system initiates a prompt requesting the cleaning task. The card reader device is cleaned with a cleaner card including a cleaning surface and a data strip. The cleaner card is inserted into the card reader device so that first the cleaning surface comes in contact with the head, thereby cleaning the card reader device, and then the data strip of the card comes in contact with the head. The card reader reads data encoded on the data strip and sends it to the computing device. The computing device acknowledges that the head of the card reader device has been cleaned and cancels the prompt accordingly.

31 Claims, 2 Drawing Sheets in the following description of the preferred embodiment, only the front side 16 will be discussed for

CLEANING SYSTEM FOR A CARD READER

BACKGROUND OF THE INVENTION

The invention relates generally to an electronic card reader device for reading data cards and, more particularly, to a system and method for periodically cleaning a head inside the card reader device.

Data cards are compact, reliable, and convenient devices used in many different transactions. There are many different uses of data cards. Examples include, identification cards used to operate an automatic door lock, bank cards used to check a balance of bank account, and credit cards used to purchase goods and services. The wide business and consumer acceptance of data cards has continually encouraged their use in new and different applications. One relatively new application is to provide a card reader device in a fuel dispenser so that a customer can pay for fuel at the dispenser itself.

A common type of data card is a magnetic strip card. Magnetic strip cards work by having a magnetic strip attached to a plastic card. The magnetic strip has encoded thereon data that is relevant to the card's particular application. For example, a credit card has data that includes a customer account number and a credit card company. In this way, if a customer wants to make a purchase from a retailer, the retailer can read the credit card so that it may contact the credit card company and receive payment from the customer account, in accordance with the customer's purchase.

Data cards are usually read using a card reader device. A card reader device includes an optical or magnetic head for reading the data from the card and an interface that allows it to transmit the data to a separate computing device. Using the credit card example above, the magnetic head converts the magnetically encoded data stored on the magnetic strip of the card into electronic data. The electronic data is then transferred to the computing device, where it is used by the retailer to learn of the purchaser's credit card company and account number.

Due to the environment in which these card reader devices are used, these devices often experience failure and/or damage due to dirty or unclean heads. Typically, the task of cleaning the heads belongs to a store operator or maintenance person, hereinafter operator. Cleaning the head is ideally performed on a periodic basis, depending on such factors as the amount of usage by the card reader device and the amount of time since the last clean was performed. However, this task is often neglected, or simply forgotten, thereby resulting in the failure or damage of the card reader device.

As a partial solution to the above describe problem, some systems provide a prompt to the operator indicating that it is time to clean the head. In an ideal setting, the prompt is issued, the operator cleans the head, and then the operator resets the prompt to indicate that the head has been cleaned. However, these prompts are inherently unreliable. For example, the prompt may issue during a busy or otherwise inconvenient time. The operator resets the prompt without cleaning the head, expecting to clean the head soon thereafter. However, the operator forgets and the head goes an extended period of time without being cleaned, thereby resulting in failure or damage.

Therefore, what is needed is a system and method for indicating when a magnetic head of a card reader device needs to be cleaned.

Furthermore, what is needed is a system and method that insures that the magnetic head of the card reader device has been cleaned.

SUMMARY OF THE INVENTION

The foregoing problems are solved and a technical advance is achieved by a cleaning system and method for a card reader device that initiates a prompt when the head of the card reader device needs to be cleaned, and cancels the prompt only when the head has been cleaned. In a preferred embodiment, a card reader device is connected to a computer system that keeps track of the number of times the card reader device has been used, as well as the time since the head of the card reader device was last cleaned. Accordingly, the computer system initiates a prompt when it is time for the head to be cleaned.

The head is cleaned with a cleaner card including a cleaning surface and a data strip. The cleaning surface contains conventional cleaning components, such as a cleaning pad and alcohol, so that it cleans the head on contact. The data strip includes a data that signifies that the head has been cleaned. The cleaner card is initially inserted into the card reader device so that the cleaning surface comes in contact with the head. While in contact, the cleaning surface cleans the head. When the cleaner card has been fully inserted, the data strip of the card comes in contact with the head. As a result, the card reader device reads the data from the data strip. The cleaner card is then removed from the card reader device. The card reader device then sends the data to the computing device. The computing device acknowledges that the head of the card reader device has been cleaned and cancels the prompt accordingly.

A technical advantage achieved with the present invention is that it indicates when a head of a card reader device needs to be cleaned.

Another technical advantage achieved with the present invention is that it insures that the head of the card reader device actually has been cleaned.

DETAILED DESCRIPTION OF THE PREFERRED EMBODIMENT

Figure 1:
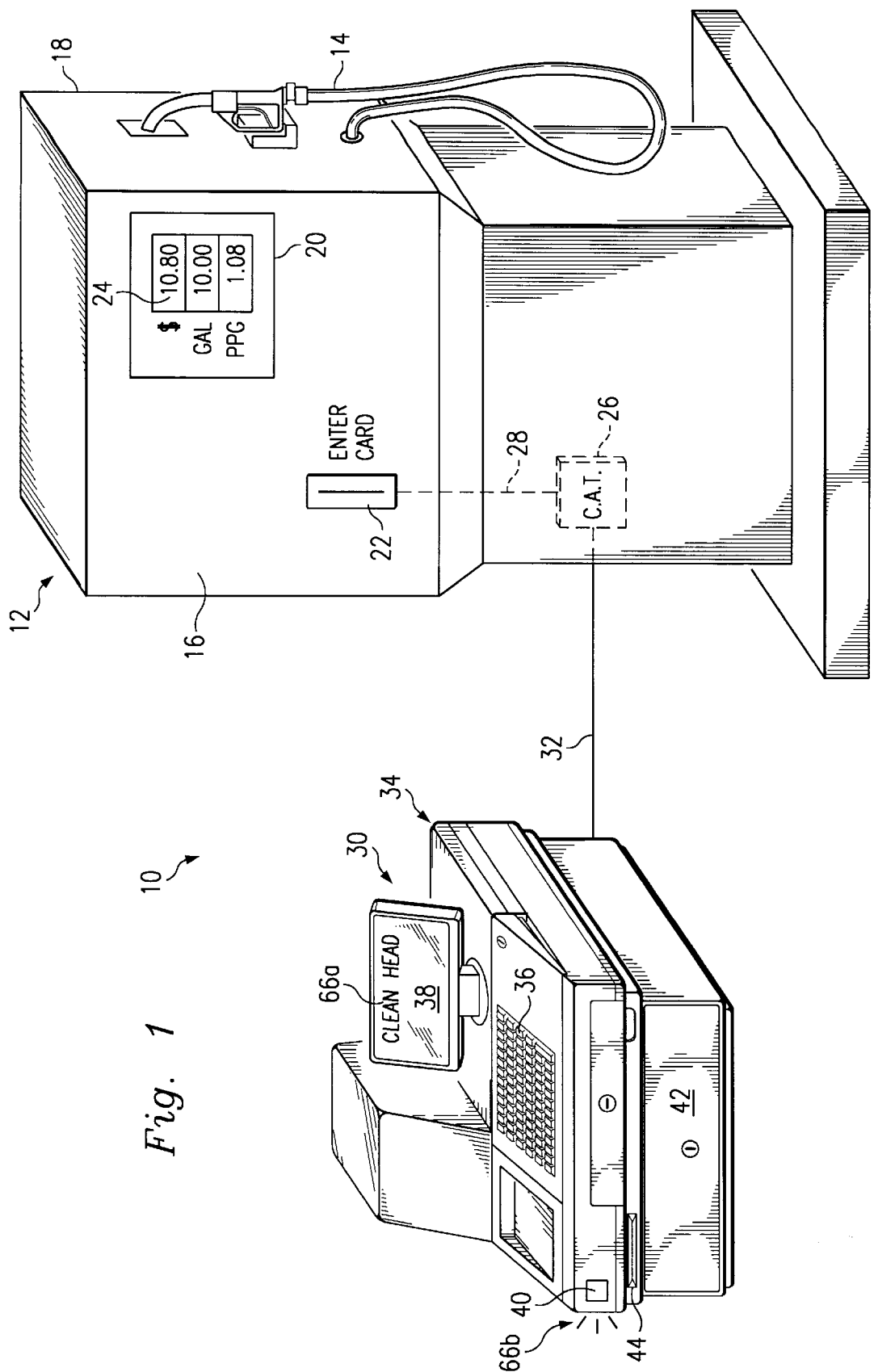
FIG. 1 is a diagram of a fuel dispenser system embodying features of the present invention.

In FIG. 1, the reference numeral 10 refers to a fuel dispenser system embodying features of the present invention. The fuel dispenser system 1 includes a fuel dispenser 12, which contains many elements of a conventional fuel dispenser, such as a fuel nozzle 14 connected to a fuel supply (not shown). The dispenser 12 has a front side 16 and a back side 18. In the following description of the preferred embodiment, only the front side 16 will be discussed for ease of description. However, the features of the present invention may also be applied on the back side 18, thereby allowing the dispenser to be operated by two customers at the same time.

The front side 16 houses a conventional graphics display 20 and a card reader device 22, embodying features of the present invention. The graphics display 20 comprises a large, conventional, active matrix flat panel display for showing text such as a price 24 that corresponds to an amount of fuel dispensed.

The card reader device 22 is connected to a customer activated terminal ("CAT") 26, through a ribbon cable 28.

Both the CAT 26 and the ribbon cable 28 are conventional devices housed inside the dispenser 12. The CAT 26 is also connected to a computing center 30 through a bus 32. In the preferred embodiment, the computing center 30 is remotely located inside a store (not shown) where it may be readily accessed. The computing center 30 comprises a point-of-sale ("POS") controller 34. The POS controller 34 includes many features of a conventional electronic cash register, such as a keyboard 36, a display 38, a speaker 40, a cash drawer 42, and an internal card reader device 44, for use by an operator in charge of overseeing and maintaining the dispenser system 10. Although not shown, the POS controller 34 also includes a processor and memory for running a program discussed in greater detail below, with reference to FIG. 2.

Use of the dispenser system 10, with respect to the card reader device 22 and the internal card reader device 44, can be subdivided into three different operations. A typical operation allows the dispenser system 10 to receive and handle data to secure payment for fuel and other items in a conventional manner, as discussed in greater detail below. A prompting operation is used to notify the operator that one or more of the card reader devices 22, 44 need to be cleaned, as discussed in greater detail with reference to FIG. 2. A cleaning operation is used to clean the card reader devices 22, 44, as discussed in greater detail with reference to FIG. 3.

In the typical operation, the card reader device 22 receives a data card (not shown) and reads the data stored thereon. In the preferred embodiment the data card is a magnetic strip card. The card reader device 22 reads magnetized data stored on the magnetic strip card and covert it into electronic data. The card reader device 22 then transmits this electronic data to the CAT 26 through the ribbon cable 28. The CAT 26 then transmits the electronic data to the POS controller 34 through the bus 32. The POS controller uses the electronic data in order to secure payment in accordance with the data. Since this method of securing payment is well known by those of ordinary skill in the art, it will not be further discussed.

In a similar manner, the internal card reader device 44 receives a magnetic strip card (not shown) and reads magnetized data stored thereon. The internal card reader device 44 converts the magnetized data to electronic data, and transmits this data directly to the POS controller 34. In so doing either of the two card reader devices 22, 44 can be use to secure payment. For the sake of brevity, only the card reader device 22 will be further discussed, it being understood that the internal card reader device 44 behaves similarly.

Figure 2:
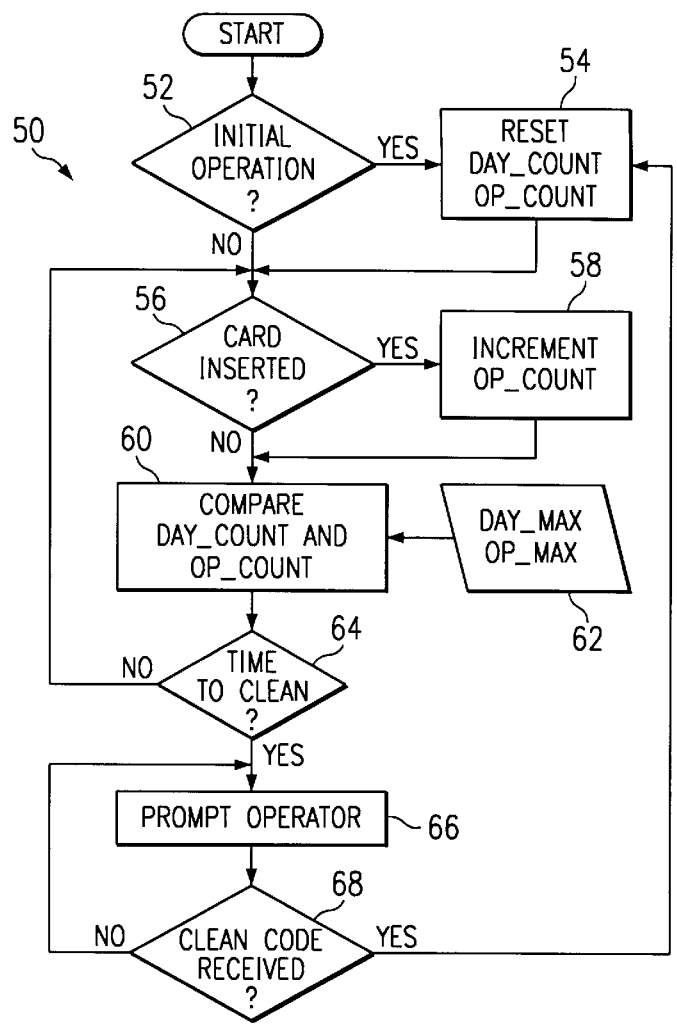
FIG. 2 is a flow chart used by a computer of the fuel dispenser system of FIG. 1.

Referring to FIG. 2, the prompting operation is initiated by a program 50 that runs on the POS controller. Execution of the program 50 begins at step 52, where a determination is made as to whether this is an initial operation. An initial operation refers to a new card reader device 22. If it is an initial operation, execution proceeds to step 54 where two variables DAY_COUNT and OP_COUNT are initialized. The DAY_COUNT represents the elapsed time since the card reader device 22 was last cleaned. The OP_COUNT represents the number of times the card reader device 22 has been used.

Execution then proceeds to step 56, where a determination is made as to whether a magnetic strip card has been inserted into the card reader device 22. If so, the OP_COUNT is incremented at step 58. Although not shown, the DAY_COUNT is incremented automatically at the beginning of each day. Execution then proceeds to step 60, where the OP_COUNT is compared to a variable OP_MAX and the DAY_COUNT is compared to a variable DAY_MAX. The OP_MAX and DAY_MAX store predetermined values that indicate the maximum number of times the card reader device 22 can be used between cleanings and the maximum number of days the card reader device can go between cleanings, respectively.

At step 64, a determination is made as to whether either OP_COUNT or DAY_COUNT exceeds OP_MAX or DAY_MAX, respectively. If neither exceed, execution loops back to step 56. If either exceed, execution proceeds to step 66, which sends a prompt to the operator to clean the card reader device.

Referring again to FIG. 1, in a first embodiment, the prompt may be a message "CLEAN HEAD" 66a that appears on the display 38. In a second embodiment, the prompt may be a sound 66b projected from the speaker 40. In the preferred embodiment, the prompt includes a combination of the message "CLEAN HEAD" 66a and the sound 66b. For example, the message "CLEAN HEAD" 66a is initially displayed. If, after a specific time has elapsed, the card reader device has still not been cleaned, then the message 66a and the sound 66b are simultaneously displayed and projected.

Referring again to FIG. 2, after prompting the operator at step 66, execution proceeds to step 68 where a determination is made if a clean code has been received. The clean code signifies that the card reader device 22 has been cleaned, and is discussed in greater detail with reference to FIG. 3. If the clean code has been received, execution loops back to step 54, where the OP_COUNT and DAY_COUNT are reset. If the clean code has not been received, execution loops back to the prompt operator step 66.

Figure 3:
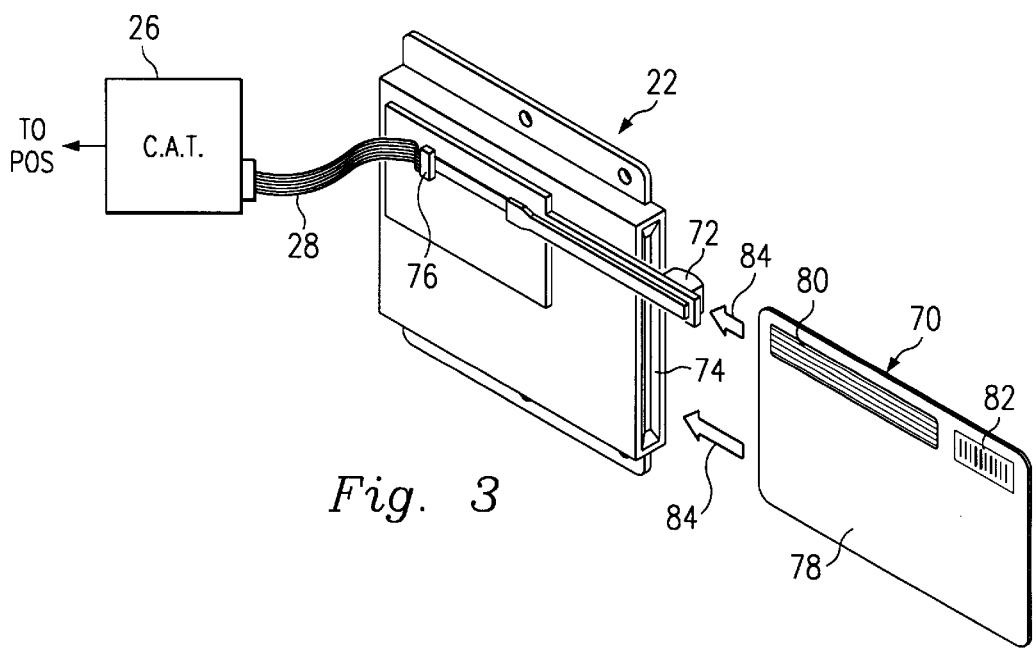
FIG. 3 is a close-up view of the card reader device and the cleaner card as used in the fuel dispenser system of FIG. 1.

Referring to FIG. 3, the cleaning operation is manually performed by the operator using a cleaner card 70 with the card reader device 22. The card reader device 22 includes a magnetic head 72, a recess 74 for receiving magnetic strip cards, and a connector 76 for connecting to the ribbon cable 28. It is understood that magnetic strip cards (not shown) are uniform as to the location of their magnetic strip. The magnetic head 72 is positioned near an opening of the recess 74 so that it aligns with the magnetic strip in an optimal position for reading data encoded therein.

The cleaner card 70 includes a plastic body 78 that is the same size and shape as a conventional magnetic strip card. Furthermore, the cleaner card 70 includes a cleaning strip 80 and a magnetic data strip 82. Both the cleaning strip 80 and the magnetic strip 82 are located in a position of the cleaner card 70 that corresponds with the uniform location of magnetic strips on conventional magnetic strip cards. The cleaning strip 80 and the magnetic card 82 are also positioned so that when the cleaner card is inserted into the recess 74 of the card reader device 22, the cleaning strip 80 comes into contact with the magnetic head before the magnetic strip 82.

The cleaning strip 80 includes a pad that is doused with a cleaning solution, such as alcohol. The magnetic strip 82 includes a unique clean code stored thereon. In this way, when the cleaner card 70 is first inserted into the recess 74 of the card reader device 22, in the direction of the reference arrow 84, the pad of the cleaning strip 80 rub against the magnetic head 72, thereby cleaning the head. As the cleaner card 70 continues into the recess 74, the magnetic strip 82 comes in contact with the magnetic head 72. The magnetic head 72 then reads the cleaning code stored on the magnetic strip 82 and transmits the code to the CAT 26 and thereafter to the POS 30. In this way, the POS 30 is informed when the card reader device 22 has been cleaned. Finally, the cleaner card 70 is removed from the recess 74, in the opposite direction of the arrows 84. Once again the pad of the cleaning strip 80 rubs against the magnetic head 72, thereby cleaning the head again.

Although not shown, in the preferred embodiment, the cleaner card 70 is stored in a disposable, moisture proof pouch. The pouch is also full of alcohol to keep the pad of the cleaning strip 80 moist. When the card reader device 22 is to be cleaned, the operator rips open the pouch and removes the cleaner card 70. Once the cleaner card 70 is used, both it and the pouch may be thrown away. In an alternative embodiment, the cleaner card 70 is not disposable. Instead, the cleaning strip 80 is separately removable and can thereby be replaced for each cleaning operation.

Although illustrative embodiments of the present invention have been shown and described, a latitude of modification, change and substitution is intended in the foregoing disclosure, and in certain instances, some features of the invention will be employed without a corresponding use of other features. For example, instead of cleaning the magnetic head 72, the cleaner card 70 may be a service card used to de-magnetize or perform other services to the card reader device 22. Also, the present invention can be used for optical reading devices, wherein an optical data strip, such as bar code, is read from the data card. The invention can work with indoor card readers. The CAT computer can track the number of reads and just send a "head needs to be cleaned" message to the POS. Finally, additional circuits and features may be added to the illustrative embodiment without altering the scope of the invention. Accordingly, it is appropriate that the appended claims be construed broadly and in a manner consistent with the scope of the invention.

What is claimed is:

1. A fuel dispenser system comprising a card reader device capable of reading a code from a cleaner card for cleaning the card reader device, a computer controller for receiving the code from the card reader device and for running a program, and a program that initiates a prompt when the card reader device needs to be cleaned and removes the prompt only when the code from the cleaner card has been received.

2. The system of claim 1 wherein the program initiates the prompt after an elapsed period of time.

3. A fuel dispenser system comprising a card reader device capable of reading a code from a cleaner card for cleaning the card reader device a computer controller for receiving the code from the card reader device and for running a program, and a program that initiates a prompt when the card reader device needs to be cleaned and removes the prompt only when the code from the cleaner card has been received, wherein the program initiates the prompt after the card reader device has been used a predetermined number of times.

4. A fuel dispenser system comprising a card reader device capable of reading a code from a cleaner card for cleaning the card reader device a computer controller for receiving the code from the card reader device and for running a program, and a program that initiates a prompt when the card reader device needs to be cleaned and removes the prompt only when the code from the cleaner card has been received, wherein the cleaner card includes a cleaning portion and a magnetic strip portion.

5. The system of claim 1 wherein the card reader device comprises a magnetic head for receiving the code and converting the code to an electronic code for use by the computer controller.

6. The system of claim 1 wherein the computer controller comprises a point-of-sale computer.

7. The system of claim 6 wherein the point-of-sale computer includes a display and the prompt is a message on the display.

8. The system of claim 1 where, in typical operation, the card reader device is capable of reading one or more of: a credit card, a bank card, or a identification card.

9. A system for serving a card reader device capable of reading a code from a card, the system comprising: a service card capable of performing the service and including a code thereon capable of being read by the card reader device, a computer controller for receiving the code from the card reader device and for running a program, and a program that initiates a prompt when the card reader device needs to be serviced and removes the prompt only when the code from the service card has been received.

10. The system of claim 9 wherein the program initiates the prompt after either an elapsed period of time or after the card reader device has been used a predetermined number of times.

11. The system of claim 9 wherein the card reader device reads optical data from a card in typical operation.

12. A system for serving a card reader device capable of reading a code from a card, the system comprising: a service card capable of performing the service and including a code thereon capable of being read by the card reader device, a computer controller for receiving the code from the card reader device and for running a program, a program that initiates a prompt when the card reader device needs to be serviced and removes the prompt only when the code from the service card has been received, and the cleaner card, wherein the cleaner card includes a cleaning portion and a magnetic strip portion.

13. The system of claim 9 wherein the required service is a cleaning of a head on the card reader device.

14. A system for serving a card reader device capable of reading a code from a card, the system comprising: a service card capable of performing the service and including a code thereon capable of being read by the card reader device, a computer controller for receiving the code from the card reader device and for running a program, and a program that initiates a prompt when the card reader device needs to be serviced and removes the prompt only when the code from the service card has been received, wherein the required service is a de-magnetizing of the card reader device.

15. The system of claim 9 wherein the card reader device reads magnetic data from a card in typical operation.

16. The system of claim 9 wherein the prompt is a visual prompt and/or an audio prompt.

17. A method for serving a card reader device capable of reading a code from a card, the method comprising:

initiating a prompt whenever the card reader device needs to be cleaned;

inserting a cleaner card into the card reader device;

receiving a code from the cleaner card; and removing the prompt in response to receiving the code.

18. The method of claim 17 wherein the step of initiating occurs after either an elapsed period of time has expired or after the card reader device has been used a predetermined number of times.

19. The method of claim 17 wherein the cleaner card includes a cleaning portion and a data strip portion.

20. The method of claim 19 wherein the step of receiving the code comprises reading the code from the data strip portion.

21. The method of claim 17 wherein the step of initiating the prompt asserts either a visual prompt or audio prompt.

22. A method for serving a card reader device capable of reading a code from a card, the method comprising:

initiating a prompt whenever the card reader device needs to be cleaned by asserting both the visual prompt and audio prompt when a time difference between initiating the prompt and receiving the code exceeds a predetermined amount;

inserting a cleaner card into the card reader device;

receiving a code from the cleaner card; and removing the prompt in response to receiving the code.

23. A system for serving a card reader device capable of reading a code from a card, comprising:

means for initiating a prompt whenever the card reader device needs to be cleaned;

a cleaner card for cleaning the card reader device and storing a code;

means for reading the code from the cleaner card; and means for removing the prompt in response to receiving the code.

24. The system of claim 23 wherein the means for initiating the prompt initiates the prompt after either an elapsed period of time has expired or after the card reader device has been used a predetermined number of times.

25. The system of claim 23 wherein the cleaner card includes a cleaning portion and a data portion.

26. The system of claim 25 wherein the code is magnetically stored in the data portion.

27. The system of claim 23 wherein the means for initiating the prompt asserts either a visual prompt or audio prompt.

28. A system for serving a card reader device capable of reading a code from a card, comprising:

means for initiating a visual prompt or audio prompt whenever the card reader device needs to be cleaned;

a cleaner card for cleaning the card reader device and storing a code;

means for reading the code from the cleaner card;

means for removing the prompt in response to receiving the code; and means for measuring a time between when the visual prompt or audio prompt is initiated and when the prompt is removed, wherein the means for initiating the prompt asserts both the visual prompt and audio prompt when the time exceeds a predetermined value.

29. The system of claim 25 wherein the code is optically stored in the data portion.

30. A fuel dispenser system comprising a card reader device capable of reading a code from a cleaner card for cleaning the card reader device, a computer controller including a point-of-sale computer for receiving the code from the card reader device and for running a program, and a program that initiates a prompt when the card reader device needs to be cleaned and removes the prompt only when the code from the cleaner card has been received, wherein the point-of-sale computer includes a speaker and the prompt is a sound on the speaker.

31. A fuel dispenser system comprising a card reader device capable of reading a code from a cleaner card for cleaning the card reader device, a computer controller including a point-of-sale computer for receiving the code from the card reader device and for running a program, and a program that initiates a prompt when the card reader device needs to be cleaned and removes the prompt only when the code from the cleaner card has been received, wherein the point-of-sale computer includes a display and a speaker, and the prompt initially appears on either the display or speaker, and if a period of time elapses wherein the card reader device has not yet been cleaned, the prompt appears on both the display and the speaker.

* * * * *